(12) United States Patent
Voss et al.

(10) Patent No.: US 6,869,379 B2
(45) Date of Patent: Mar. 22, 2005

(54) AUTOMATIC VARIABLE-SPEED TRANSMISSION

(75) Inventors: Thomas Voss, Stuttgart (DE); Oliver Nicklass, Kronau (DE)

(73) Assignee: Getrag Innovations GmbH, Untergruppenbach (DE)

( * ) Notice: Subject to any disclaimer, the term of this patent is extended or adjusted under 35 U.S.C. 154(b) by 0 days.

(21) Appl. No.: 10/600,664

(22) Filed: Jun. 20, 2003

(65) Prior Publication Data

US 2004/0116233 A1 Jun. 17, 2004

(30) Foreign Application Priority Data

Jun. 21, 2002 (DE) .......................................... 102 28 501

(51) Int. Cl.$^7$ .............................................. F16H 37/02
(52) U.S. Cl. ..................................... 475/218; 475/207
(58) Field of Search ................................. 475/218, 207

(56) References Cited

U.S. PATENT DOCUMENTS

| | | | |
|---|---|---|---|
| 3,513,717 A | | 5/1970 | Lickey et al. |
| 3,572,167 A | * | 3/1971 | Bosko et al. ................ 475/218 |
| 5,593,358 A | * | 1/1997 | Frost .......................... 475/218 |

FOREIGN PATENT DOCUMENTS

| | | |
|---|---|---|
| DE | 29 35 590 | 4/1983 |
| DE | 37 30 230 | 3/1989 |
| DE | 43 42 957 | 6/1995 |
| DE | 196 15 267 C1 | 4/1996 |
| DE | 197 41 440 A1 | 9/1997 |
| DE | 199 08 602 A2 | 2/1999 |
| DE | 199 01 056 | 8/1999 |
| DE | 199 51 683 | 5/2001 |

\* cited by examiner

*Primary Examiner*—Dirk Wright
(74) *Attorney, Agent, or Firm*—Knobbe, Martens, Olson & Bear, LLP (57) ABSTRACT

An automatic variable-speed transmission for setting up a plurality of gear steps with an input shaft, an output shaft and two transmission units which form two parallel branches. One branch has a multi-step transmission and the other a summing transmission with a friction clutch for starting and for central synchronization, the friction clutch having a first friction element and a second friction element, one of the friction elements being connectable to various transmission elements by means of at least one shift element, with at least one first power command range for gear-step changes between low gear steps and at least one second power command range for at least the gear change into the highest gear step and for the highest gear step. In this case, the at least one shift element connects the one friction element to transmission elements such that there is reduced reactive-power flow in any operating mode.

24 Claims, 9 Drawing Sheets

| | SK 3-6 (48) | SK 4-5 (56) | SK 2 (60) | SK 7 (68) | SK IL (84) | LK (16,74) | SK AL (76) | SK Abtrieb (42) | Arretierung (39) |
|---|---|---|---|---|---|---|---|---|---|
| FORW.START | 0 | 0 | 0 | 0 | CASE | S | HR | PT | 0 |
| 1st GEAR | 0 | 0 | 0 | 0 | - | 0 | HR | PT | X |
| 2. | 0 | 0 | X | 0 | 2nd GEAR | S | HR | PT | 0 |
|  | 0 | 0 | X | 0 | 2nd GEAR | 0 | HR | PT | 0 |
| 3. | X-3 | 0 | X | 0 | 2nd GEAR | S | HR | PT | 0 |
|  | 0 | 0 | X | 0 | 0 | 0 | HR | PT | 0 |
| 4. | 0 | X-4 | 0 | X | 0 | S | HR | PT | 0 |
|  | 0 | 0 | 0 | X | 0 | 0 | HR | PT | 0 |
| 5. | 0 | X-5 | 0 | X | 0 | S | HR | PT | 0 |
|  | 0 | 0 | 0 | X | 0 | 0 | HR | PT | 0 |
| 6. | X-6 | 0 | 0 | X | 0 | S | HR | PT | 0 |
|  | 0 | 0 | 0 | X | 0 | 0 | HR | PT | 0 |
| 7. | 0 | 0 | 0 | 0 | 0 | X | HR | PT | 0 |
| REARW.START | 0 | 0 | 0 | 0 | CASE | S | PT | HR | 0 |
| R | 0 | 0 | 0 | 0 | CASE | X | PT | HR | 0 |

Captions:  X - shifted     HR - ring wheel
0 - non - shifted     PT - planet carrier
S - frictional state

| | SK 6-3 (84') | SK 4 (82) | SK 5-2 (84) | SK 2-G (IL) (64') | SK 7-R (IL) (81) | K1 (not shown in Fig. 10) | LK (16') |
|---|---|---|---|---|---|---|---|
| FORW.START. | 0 | 0 | 0 | X-G | 0 | 0 | S |
| 1st GEAR | 0 | 0 | 0 | X-2 | 0 | X | 0 |
| 2. | 0 | 0 | 0 | X-2 | 0 | 0 | S |
| 3. | X-3 | 0 | X-2 | X-2 | 0 | 0 | 0 |
| 4. | 0 | X-4 | 0 | X-2 | 0 | 0 | S |
| 5. | 0 | 0 | 0 | 0 | X-7 | 0 | 0 |
| 6. | X-6 | 0 | X-5 | 0 | X-7 | 0 | S |
| 7. | 0 | 0 | 0 | 0 | X-7 | 0 | 0 |
| REARW.START | 0 | 0 | 0 | 0 | X-R | 0 | S |
| R | 0 | 0 | 0 | 0 | X-R | 0 | X |

Captions:  X - shifted
O - non-shifted
S - frictional state

Fig.12

| | SK 6 (48) | SK 5-4 (92) | SK 3-2 (90) | SK 2-7 (64") | SK R-G (94) | K1 (96) | LK (16") |
|---|---|---|---|---|---|---|---|
| FORW.START | 0 | 0 | 0 | 0 | X-G | 0 | S |
| 1st GEAR | 0 | 0 | 0 | X-2 | 0 | X | 0 |
| 2. | 0 | 0 | X-2 | X-2 | 0 | 0 | S |
| 3. | 0 | 0 | X-3 | X-2 | 0 | 0 | 0 |
| 4. | 0 | X-4 | 0 | X-2 | 0 | 0 | S |
| 5. | 0 | X-5 | 0 | X-7 | 0 | 0 | 0 |
| 6. | X | 0 | 0 | X-7 | 0 | 0 | S |
| 7. | 0 | 0 | 0 | X-7 | 0 | 0 | 0 |
| REARW.START | 0 | 0 | 0 | 0 | X-R | 0 | S |
| R | 0 | 0 | 0 | 0 | X-R | 0 | X |

Captions: X - shifted
0 - non-shifted
S - frictional state

Fig.13

AUTOMATIC VARIABLE-SPEED TRANSMISSION

RELATED APPLICATIONS

This application claims the benefit of the German Application 102 28 501.2 filed Jun. 21, 2002 in Germany which is incorporated herein in its entirety by reference.

BACKGROUND OF THE INVENTION

1. Field of the Invention

The invention relates to an automatic variable-speed transmission for setting up a plurality of gear steps, in particular for motor vehicles.

2. Description of the Related Art

Conventional manual transmissions are designed, as is known, as countershaft transmissions in the spur-wheel form of construction. These transmissions offer high efficiency on account of the form-locking effect of the meshing action. To change the gears, however, the transmission must, as a rule, be set so as to be load-free, with the result that an interruption in traction occurs. This is scarcely noticeable in subjective terms during manual shifting.

For a few years, however, there has also been a tendency towards what are known as automated shift transmissions. In these, gear changes take place by means of actuators. As a rule, this type of transmission is coupled to an actuator-operated starting and separating clutch of conventional form of construction. This transmission admittedly offers even higher efficiency in a mapping-controlled automatic mode. However, in the automatic mode, the interruptions in traction which occur become noticeable in a more unpleasant way in subjective terms. A transmission of this type is known, for example, from DE 196 15 267 A1.

Furthermore, to improve comfort, a transmission was proposed (DE 199 08 602 A1) in which the synchronizing units of the countershaft transmission are designed to have an at least part-load capability. It is thereby possible, in the event of a gear change, to take over the prevailing engine torque on the synchronizing unit of the target gear, without the input-side separating clutch being opened completely. The traction collapse during a shift operation is consequently appreciably mitigated.

Furthermore, in the field of automatic transmissions for motor vehicles, there are what are known as "classic" automatic transmissions. These have a hydrodynamic torque converter and, as a rule, a plurality of planet-wheel trains which are activated by means of clutches or brakes. As is known, with such automatic multi-step transmissions, gear changes can be carried out under load without any interruption in traction. One disadvantage of this type of automatic transmission is the lower efficiency which is caused essentially by the hydrodynamic torque converter. To improve the efficiency, the converter can in many instances be bridged by means of a lock-up clutch.

Moreover, in the field of automatic transmissions, there are what are known as continuously variable transmissions. The mechanically continuously variable wrap-around transmissions with steel band (CVT) are the furthest advanced in this context.

Finally, what are known as double-clutch transmissions have also been known for many years. These have two parallel force transmission branches and two parallel starting and separating clutches which can be activated in an overlapping manner. By means of this type of transmission, too, gear changes can be carried out under load without any interruption in traction. However, the outlay in structural terms is very considerable because of the two clutches. Furthermore, double-clutch transmissions cannot be controlled in a simple way in regulating terms.

A further type of automatic variable-speed transmission is known from DE 197 41 440 A1. The variable-speed transmission has a first torque-transmitting device which is arranged between the drive shaft and the output shaft and allows various transmission ratios and which, in one operating mode, ensures a complete force-flux uncoupling of drive shaft and output shaft. Parallel to the first device, a second device for torque transmission between the drive shaft and the output shaft is provided, by means of which, in contrast to the first device, a continuously selectable torque in the range of 0 to the maximum prevailing torque can be transmitted. However, the variable-speed transmission has only four gears and, overall, a relatively low spread. Moreover, the efficiency is open to improvement.

SUMMARY OF THE INVENTION

Against this background, the object of the invention is to specify an improved automatic variable-speed transmission.

This object is achieved by means of an automatic variable-speed transmission for setting up a plurality of gear steps for motor vehicles, the variable-speed transmission having an input shaft, an output shaft and two transmission units which form two parallel branches, of which one branch has a multi-step transmission and the other branch a summing transmission with a friction clutch for starting and for central synchronization, the friction clutch having a first friction element and a second friction element, one of the friction elements being connectable to various transmission elements by means of at least one shift element, with the result that at least one first power command range for gear-step changes between low gear steps and at least one second power command range for at least the gear change into the highest gear step and for the highest gear step are set up, the at least one shift element connecting the one friction element to transmission elements such that there is reduced reactive-power flow in any operating mode.

By an operating mode are meant, in the present instance, forward gears and shift operations between these. By contrast, reactive-power flows may occur during shifting into or driving in reverse gear.

One embodiment provides an automatic variable-speed transmission, in which a power flow can be transmitted positively in the predominant number of gear steps. For starting and for central synchronization, a friction clutch is provided which, in the event of gear changes, by being suitably activated, takes over in the second branch a torque prevailing on the transmission input side. The original gear is subsequently deselected and rotational-speed equalization for the target gear of the multi-step transmission takes place.

In such a centrally synchronized variable-speed transmission, the following power flows may theoretically occur:

In a non-branched power flow, the transmission input power flows solely via the branch having the multi-step transmission.

In a branched power flow with a reactive-power flow, the transmission input power is apportioned to the two branches, in the summing transmission a part of the power being returned into the variable-speed transmission and then being conducted via the friction clutch. In this case, the friction clutch controls the absolute quantity of reactive power.

In a branched power flow without a reactive-power flow, the transmission input power is distributed in the two branches, summed in the summing transmission, without the return of reactive power, and supplied to the output shaft of the transmission.

In one embodiment, the shift element connects the first friction element only to transmission elements such that a reactive-power flow does not occur in any operating mode, only a non-branched power flow or a branched power flow without a reactive-power flow occurs in the variable-speed transmission.

High efficiency overall is consequently obtained.

One embodiment of a variable-speed transmission makes it possible, by means of a single clutch, such as a friction clutch designed as a power-shift clutch, to carry out any gear change under load virtually without any interruption in traction.

In the present connection, the terms "gear" and "gear step" are used in an equivalent way.

It is particularly preferred if the at least one shift element connects the first friction element in each case to a gearwheel of wheel trains of the multi-step transmission in both power command ranges.

By virtue of this measure, even in the case of a branched power flow, a reactive-power flow is avoided in both power command ranges.

According to a further preferred embodiment, the spur-wheel transmission has a wheel train with a transmission ratio higher than 1 (overdrive wheel train), and the at least one shift element connects the first friction element to a gearwheel of the overdrive wheel train in the second power command range.

As a result, first, a high spread of the automatic variable-speed transmission is achieved, and the connection to a gearwheel of the overdrive wheel train makes it possible for reduced reactive-power flow to occur in any operating mode.

Furthermore, it is preferred if one of the gear steps is a direct gear step and if the direct gear step is a lower gear step than the highest gear step, so that the overall transmission ratio in the highest gear step is lower than 1 (overdrive).

A high spread of the variable-speed transmission is thereby achieved, as in the previous embodiment. By the direct gear being set up, the outlay in structural terms is reduced.

According to a further preferred embodiment, the input power in the highest gear step is branched to the two branches, the friction clutch being shifted into frictional connection.

In this case it is preferred, furthermore, if the input power in the other gear steps is led as a non-branched power flow through the transmission, in particular through the positive multi-step transmission.

It is particularly preferred, furthermore, if, by means of the at least one shift element, the first friction element of the friction clutch is selectively connectable to the case or to the wheel train for the highest gear step or to the wheel train for a further gear step.

In this preferred embodiment, the first friction element can be connected to the wheel train for the highest gear step, so that synchronization can be achieved even when the highest gear is designed as overdrive. Furthermore, the diversity of connection possibilities results, overall, in improved efficiency.

It is particularly preferred if the further gear step is the second gear step or the third gear step.

An improved connection can thereby be implemented for each power command range.

Furthermore, it is particularly preferred if the friction clutch is arranged in the axial direction between the multi-step transmission and the summing transmission.

What is achieved thereby is that the device for the reversal of direction of rotation is not arranged spatially parallel to the countershaft transmission. It is possible, to that extent, to design the automatic variable-speed transmission more compactly in the radial direction.

It is advantageous, overall, if the summing transmission has a planet-wheel train.

By means of the planet-wheel train, it is possible both to achieve a reversal of direction of rotation and to form in a simple structural way a summing transmission for the two branches of the variable-speed transmission.

In this case, it is particularly preferred if the input shaft is connected to the sun wheel of the planet-wheel train.

The power prevailing on the transmission input side can thereby be transmitted to the planet-wheel train directly and in a structurally simple way.

Furthermore, it is preferable if the second friction element of the friction clutch is connectable selectively to the ring wheel or the planet carrier of the planet-wheel train by means of a second shift element.

A reversal of direction of rotation can thereby be implemented in a simple way.

According to a further preferred embodiment, the output shaft is connectable selectively to the ring wheel or the planet carrier of the planet-wheel trains by means of a third shift element.

This measure serves for the structurally simple implementation of a reversal of direction of rotation.

According to an alternative embodiment, the second friction element of the friction clutch is connected fixedly to the ring wheel of the planet-wheel train.

This results in a simplified construction with fewer shift elements.

This embodiment is preferred particularly when the multi-step transmission has a wheel train for reverse gear.

Instead of a second and a third shift element for the reversal of direction of rotation, in this embodiment there is a specific wheel train for reverse gear which can be shifted by means of a suitable shift element. The wheel train for reverse gear may in this case have in a conventional way an intermediate wheel for the reversal of direction of rotation.

By virtue of the measures for the provision of reverse gear, the variable-speed transmission according to the invention can manage, overall, with markedly fewer shift elements. Furthermore, overall, a shorter form of construction in the axial direction can be achieved as a result.

According to a particularly preferred embodiment, the input shaft is surrounded by a hollow shaft.

It is thereby possible to design the variable-speed transmission compactly in the axial direction.

In this case, it is particularly preferred if the hollow shaft forms the output shaft of the multi-step transmission.

This refinement makes it possible in a structurally easy way to connect the sun wheel fixedly to the transmission input shaft and the planet carrier fixedly to the output shaft of the multi-step transmission.

Consequently, it is likewise advantageous if the hollow shaft is connected to the planet carrier of the planet-wheel train.

Furthermore, it is advantageous in structural terms if one wheel of a wheel train of the highest gear is mounted rotatably on the hollow shaft.

In this way, the series connection between the friction clutch and the wheel train of the highest gear can be implemented comparatively simply in structural terms and with a compact form of construction.

It is consequently advantageous if the rotatably mounted wheel of the wheel train of the highest gear step is connected to the first friction element of the friction clutch.

According to a preferred embodiment, one wheel of the separately provided wheel train for reverse gear is mounted rotatably on the hollow shaft.

As a result, a series connection between the friction clutch and the wheel train of reverse gear can be implemented comparatively simply in structural terms and with a compact form of construction.

In this way, it is particularly advantageous if that wheel of the wheel train for reverse gear which is mounted rotatably on the hollow shaft is connected to the first friction element of the friction clutch.

By virtue of this measure, it is possible to start in reverse gear via the friction clutch. Reverse gear is selected completely only when the friction clutch is completely closed. In this operating mode, a branched power flow is obtained in reverse gear, in a similar way to the highest gear. In the operating mode in reverse gear, however, a reactive-power flow may occur.

Furthermore, it is advantageous if a shift clutch is synchronized for the selection of reverse gear. As a result, the wheel train for reverse gear can be shifted more easily into the power flow, in spite of a reversal of direction of rotation.

It goes without saying that the features mentioned above and those yet to be explained below can be used not only in the combination specified in each case, but also in other combinations or alone, without departing from the scope of the invention.

BRIEF DESCRIPTION OF THE DRAWINGS

Exemplary embodiments of the invention are illustrated in the drawings and are explained in more detail in the following description. In the drawings.

DETAILED DESCRIPTION OF THE PREFERRED EMBODIMENT

Figure 1:
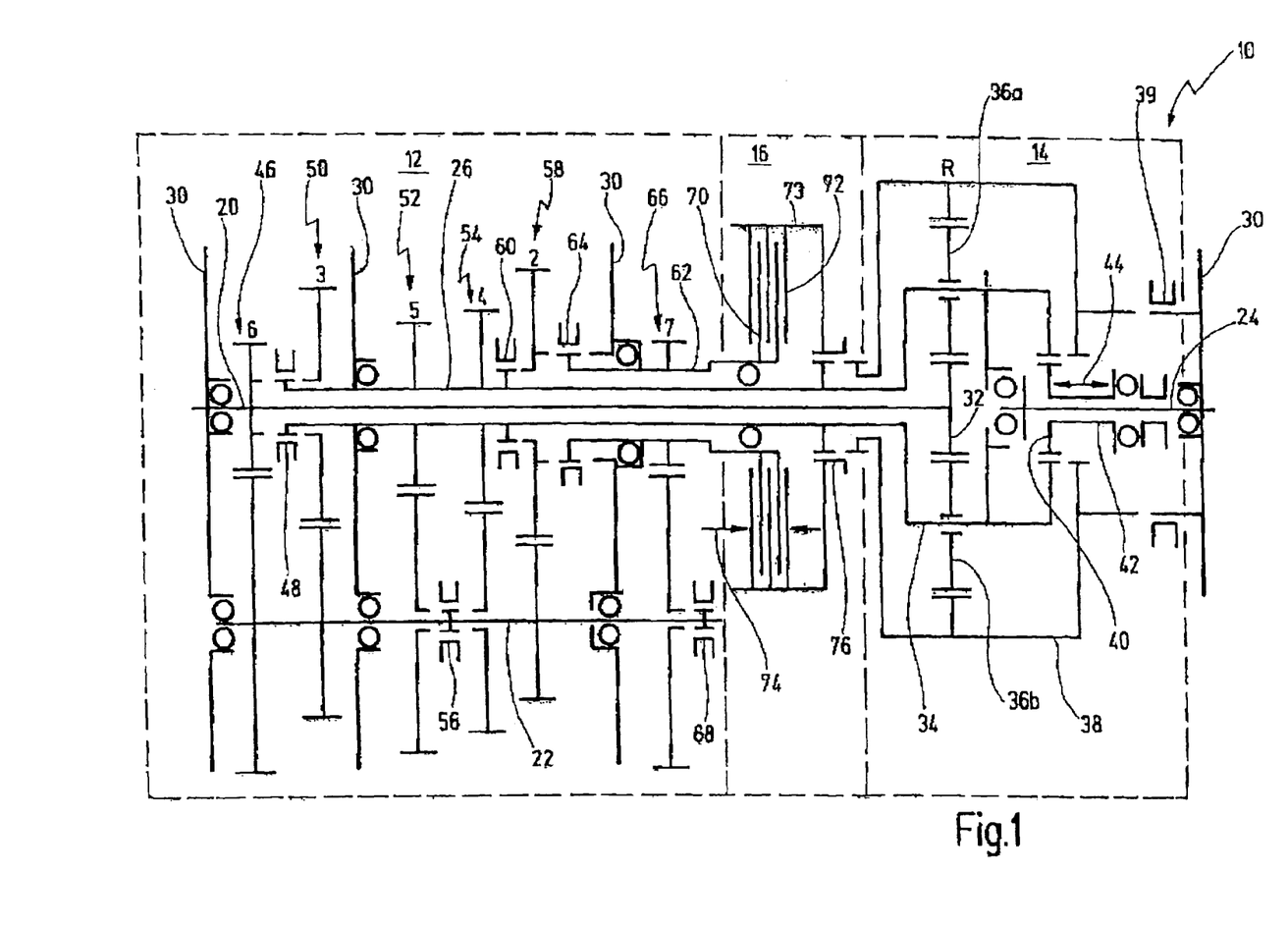
FIG. 1 shows a drawing of a transmission diagram of one embodiment of an automatic variable-speed transmission.
Figure 2:
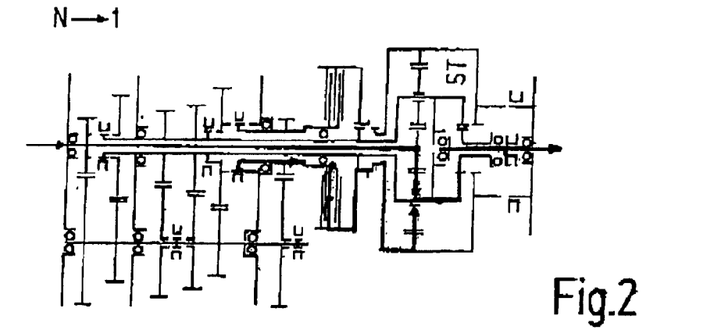
FIG. 2 shows an illustration of the transmission of FIG. 1, with the power flow during starting being emphasized.

A first embodiment of an automatic variable-speed transmission according to the invention is designated in general by 10 in FIG. 1. The variable-speed transmission 10 is designed as a motor vehicle transmission, in particular for use in combination with a conventional internal combustion engine.

The variable-speed transmission 10 has a multi-step transmission in the form of a countershaft transmission 12, a planet-wheel train 14 and a multiple-disc clutch 16.

The variable-speed transmission 10 has, furthermore, an input shaft 20 and a countershaft 22 arranged parallel to the latter. An output shaft 24 is provided coaxially to the input shaft 20. A hollow shaft 26 is mounted around the input shaft 20 rotatably in relation to the latter. The variable-speed transmission 10 has, furthermore, a case 30, indicated diagrammatically, on which the shafts 20 to 26 are mounted rotatably.

The planet-wheel train 14 has, in a form of construction which is conventional per se, a sun wheel 32, a planet carrier 34 with planet wheels 36, and also a ring wheel 38. The ring wheel 38 can be secured to the case 30 by means of a locking device 39.

A sliding wheel 40 is provided on a shift hub 42 which is movable in the axial direction, as indicated by an arrow 44. By the shift hub 42 being displaced, the sliding wheel 40 can be connected selectively to the planet carrier 34 or to the ring wheel 38.

The shift hub 42 is connected fixedly in terms of rotation to the transmission output shaft 24, so that the output shaft 24 can be connected selectively to the planet carrier 34 or to the ring wheel 38.

Alternatively to this, it is also possible to mount the shift hub 42 rotatably on the output shaft 24 and to connect it merely selectively to the output shaft 24, for example by means of a conventional shift clutch. This embodiment is advantageous when it is intended, in specific operating situations, to uncouple the transmission input completely from the transmission output.

A branching wheel train 46 is provided in the manner of a constant on the transmission input side. The branching wheel train 46 has a fixed wheel connected to the transmission input shaft and a fixed wheel connected to the countershaft 22. The input shaft 20 and the countershaft 22 consequently rotate synchronously with one another constantly.

In one embodiment, a separating clutch is provided between the variable-speed transmission 10 and the internal combustion engine of the motor vehicle. In another embodiment, however, the output shaft of the internal combustion engine is unreleasably connected fixedly in terms of rotation to the transmission input shaft 20.

The branching wheel train 46 is followed in the axial direction, as seen from the transmission input, by a shift clutch 48 for the gears 3 and 6, a wheel train 50 for third gear, a wheel train 52 for fifth gear, a wheel train 54 for fourth gear, a shift clutch 56 for the gears 4 and 5, a wheel train 58 for second gear and a shift clutch 60 for second gear.

The wheel train 50 for third gear has a loose wheel mounted rotatably on the hollow shaft 26. The wheel train 52 for fifth gear has a loose wheel mounted rotatably on the countershaft 22. The wheel train 54 for fourth gear has a loose wheel mounted rotatably on the countershaft 22. The wheel train 58 for second gear has a loose wheel mounted rotatably on the hollow shaft 26. The shift clutch 48 serves for connecting the hollow shaft 26 either directly to the input shaft 20 or to the wheel train 50 for third gear.

The variable-speed transmission 10 is set up in such a way that, in the case of a direct connection between the transmission input shaft 20 and the hollow shaft 26, sixth gear is selected, which is consequently provided as a direct gear with the transmission ratio 1.

The shift clutch 56 is provided on the countershaft 22 and serves for selectively connecting the wheel train 52 for fifth gear or the wheel train 54 for fourth gear to the countershaft 22.

The shift clutch 60 is provided on the hollow shaft 26 and serves for connecting the wheel train 58 for second gear to the hollow shaft 26.

The set-up described hitherto corresponds, for the gears discussed, to the general functioning of a manual-shift countershaft transmission, the hollow shaft 26 forming the output shaft of the countershaft transmission 12.

An outer hollow shaft or clutch hub 62 is mounted fixedly in terms of rotation on the hollow shaft 26.

The outer hollow shaft 62 can be connected selectively to the transmission case 30 or the loose wheel of the wheel train 58 for second gear by means of a preselection shift clutch 64. Furthermore, a fixed wheel of a wheel train 66 for seventh gear is secured to the outer hollow shaft 62. A loose wheel of the wheel train 66 is mounted rotatably on the countershaft 22. Furthermore, on the countershaft 22, a shift clutch 68 is provided which serves for connecting the loose wheel of the wheel train 66 to the countershaft 22.

Furthermore, inner discs 70 of the multiple-disc clutch 16 are secured to the outer hollow shaft 62. Outer discs 72 of the multiple-disc clutch 16 are secured to a rotatably mounted disc carrier 73.

It is indicated diagrammatically at 74 that the discs 70, 72 of the multiple-disc clutch 16 can be loaded with a pressure force. By means of the pressure force 74, the differential rotational speed between the inner discs 70 and outer discs 72 is controlled or regulated to any value from zero to any value desired. A differential rotational speed of zero is also designated, in the present context, as a frictional connection.

The disc carrier 73 can be connected selectively to the hollow shaft 26 or the ring wheel 38 by means of a shift clutch 76.

The functioning of the variable-speed transmission 10 is further explained with reference to FIGS. 2 to 9.

During idling, the input shaft 20 is driven by the internal combustion engine. Before the motor vehicle is started, the output shaft 24 is stationary. None of the shift clutches 48, 56, 68 is shifted. The shift clutch 76 connects the disc carrier 73 to the hollow shaft 26. The sliding wheel 40 is connected to the planet carrier 34. The rotational speed of the sun wheel consequently leads to a corresponding rotational speed of the planet wheels 36 and to a corresponding idling rotational speed of the ring wheel 38.

For starting (see FIG. 2), first, the outer hollow shaft 62 is connected to the transmission case 30 by means of the preselection shift clutch 64. The inner discs 70 are then consequently fixed in relation to the case. Furthermore, the shift clutch 76 is shifted in such a way that the outer discs 72 are connected to the ring wheel 38.

Figure 3:
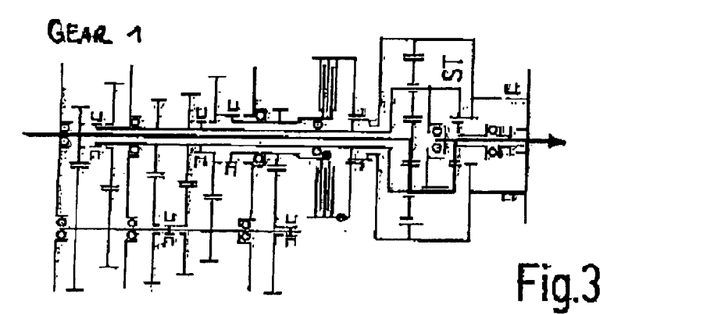
FIG. 3 shows an illustration of the transmission of FIG. 1, with the power flow in the case of a selected first gear being emphasized.
Figure 9:
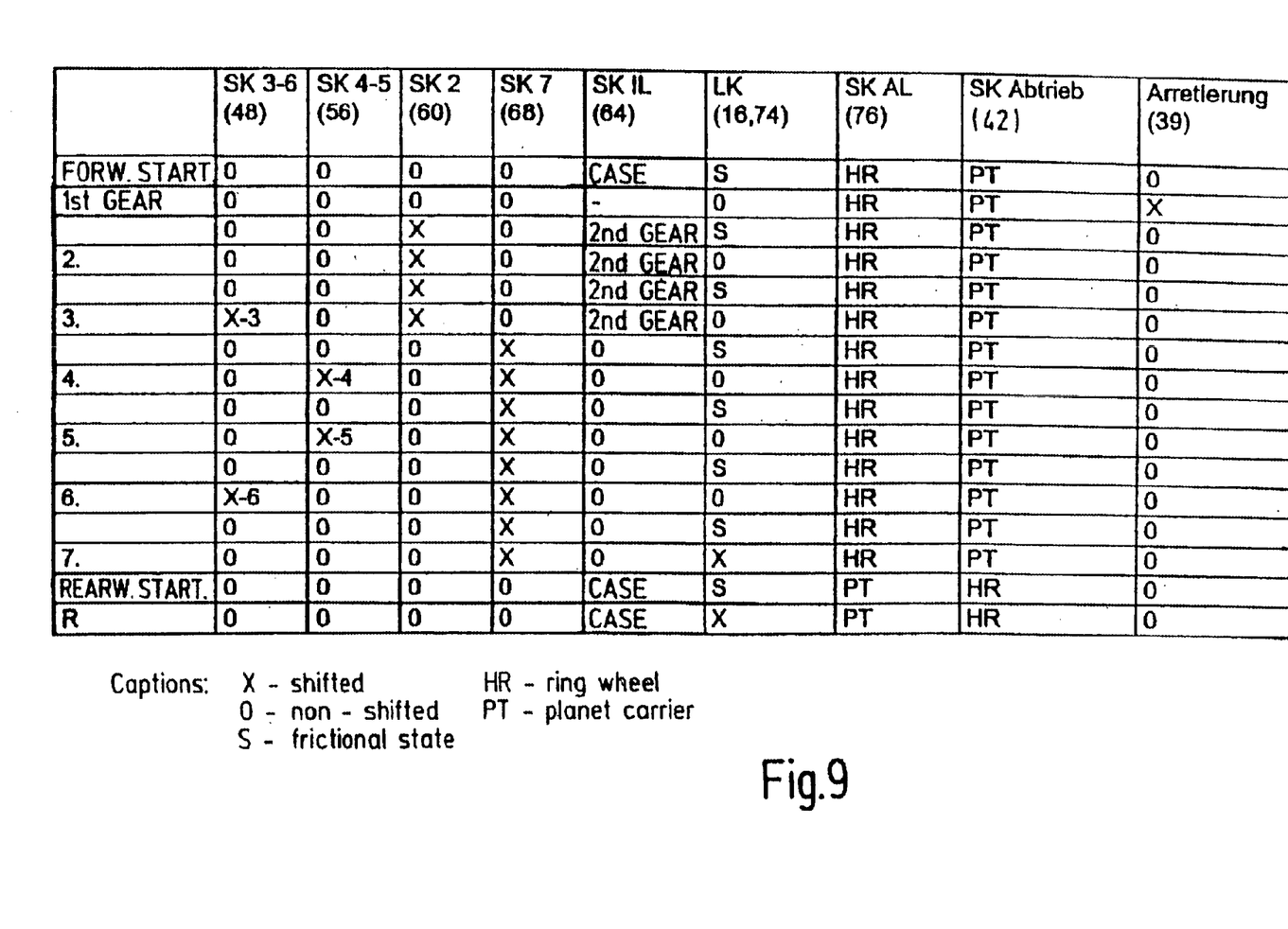
FIG. 9 shows a table of the shift states of shift clutches of the variable-speed transmission of FIG. 1 in different operating states.

For starting in the first forward gear, as shown in the first row in FIG. 9, the multiple-disc clutch 16 is loaded so that the ring wheel 34 can be supported to an increasing extent on the transmission case 30. This has the effect that the power on the transmission input side is led increasingly to the planet carrier, so that the motor vehicle starts up. When the multiple-disc clutch 16 is frictionally connected, first gear is selected. To relieve the multiple-disc clutch 16, the ring wheel 38 can be secured to the case 30 by means of the locking device 39 in this state (FIG. 3).

Figure 4:
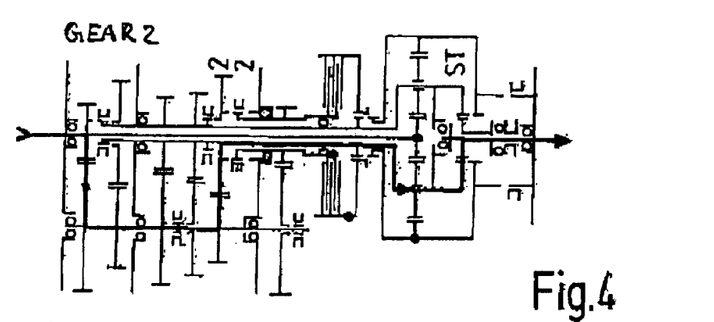
FIG. 4 shows an illustration of the transmission of FIG. 1, with the power flow in the case of a selected second gear being emphasized.
Figure 5:
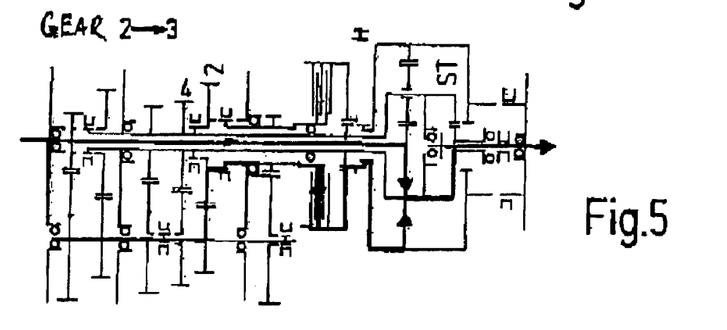
FIG. 5 shows an illustration of the transmission of FIG. 1, with the power flow during the shift from second to third gear being emphasized.

To shift into second gear, the shift clutch 64 is changed over, so that the inner discs 70 are connected to the loose wheel of second gear. Subsequently, the multiple-disc clutch 16 is loaded and the locking device 39 is released. By the multiple-disc clutch 16 being suitably loaded, the torque and the rotational speed are suitably influenced until the shift clutch 60 for the wheel train 58 of second gear can be selected in an essentially load-free manner. The multiple-disc clutch 16 is subsequently relieved, so that the flow is then led solely from the input shaft 20 to the countershaft 22, then to the hollow shaft 26 and finally, via the planet carrier 34, to the output shaft 24. This state is shown in FIG. 4.

To shift from second to third gear, the multiple-disc clutch 16 is loaded, in order to take over the torque located on the transmission input side. This leads to a branched power flow, on the one hand, to the planet carrier 34 via the transmission input shaft 20 and, on the other hand, to the planet carrier 34 via the countershaft 22, the wheel train 58, the multiple-disc clutch 16 and the ring wheel 38. This state is illustrated, emphasized, in FIG. 5. As a result, the shift clutch 60 is relieved and can be deselected. Subsequently, by suitable control of the multiple-disc clutch 16, rotational-speed equalization can take place, so that the shift clutch 48 can be connected, load-free, to the loose wheel of the wheel train 50 for third gear. The multiple-disc clutch 16 is subsequently relieved again, so that the power flow is again led purely by power, in the manner of a countershaft transmission, to the output shaft.

The gear changes 1 to 3 all follow the pattern described above.

In the case of a shift gear change from third to fourth gear, the shift clutch 64 is released and the shift clutch 68 is closed. Consequently, the inner discs 70 of the multiple-disc clutch 16 are connected to the wheel train of the highest gear (here, gear 7).

Figure 6:
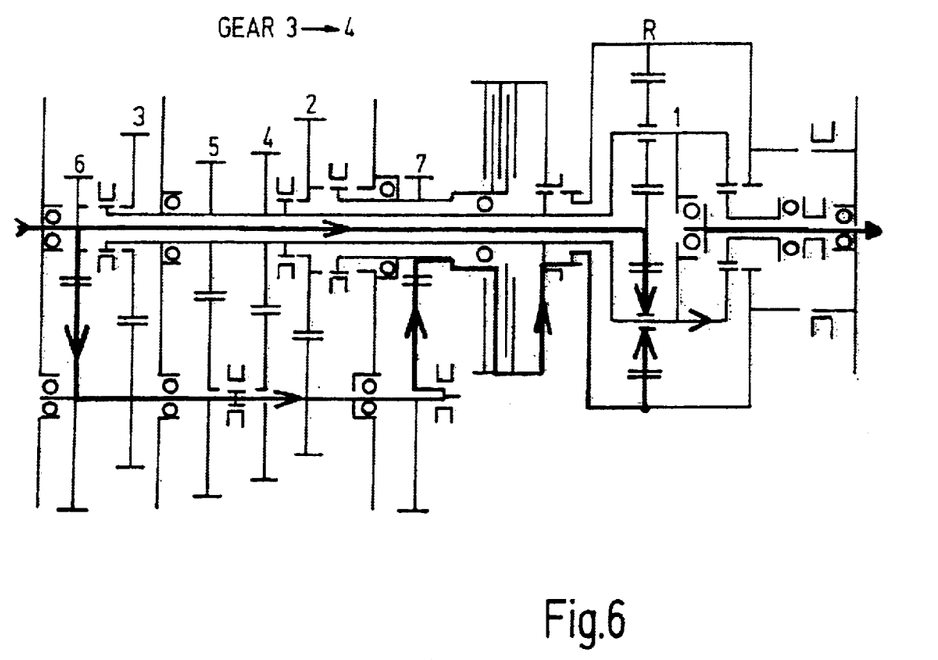
FIG. 6 shows an illustration of the transmission of FIG. 1, with the power flow during the shift from third to fourth gear being emphasized.
Figure 7:
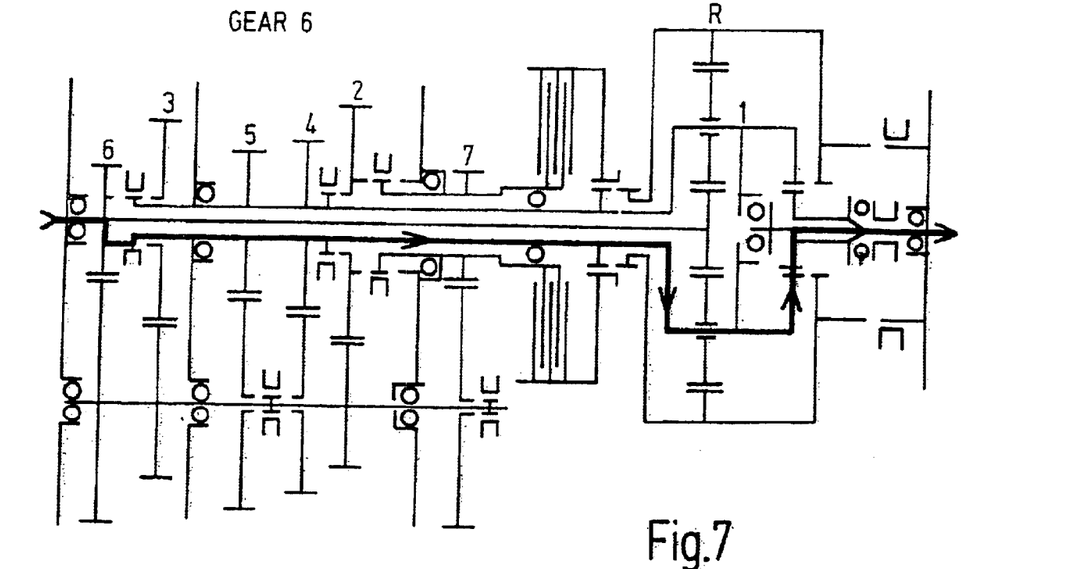
FIG. 7 shows an illustration of the transmission of FIG. 1, with the power flow in the case of a selected direct sixth gear being emphasized.
Figure 8:
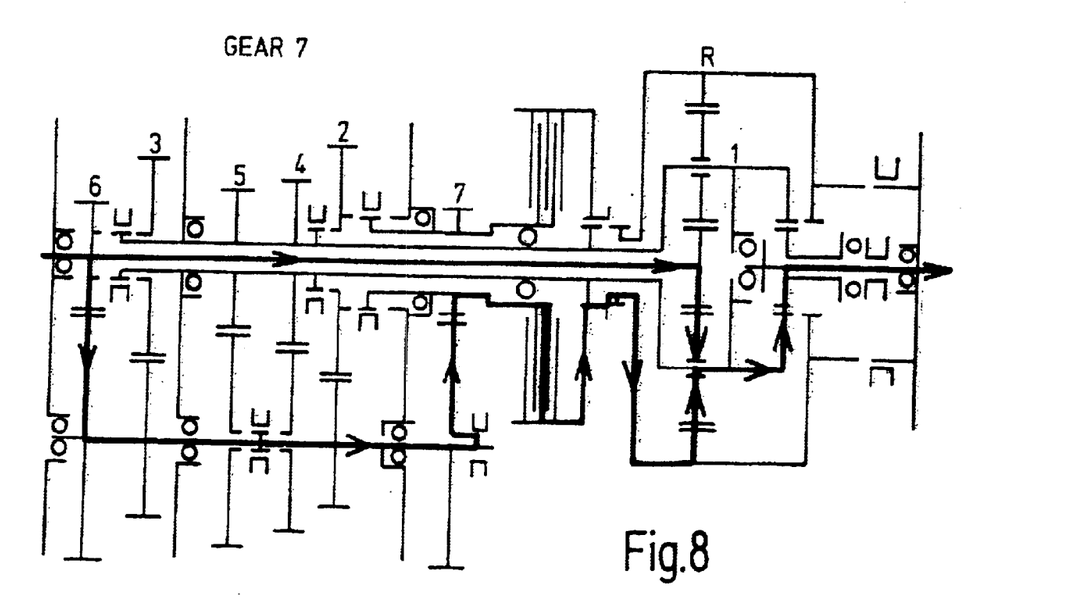
FIG. 8 shows an illustration of the transmission of FIG. 1, with the power flow in the case of a selected highest gear (overdrive) being emphasized.

Subsequently, as above, a torque take-over by means of the friction clutch 16 takes place (this is shown in FIG. 6), and then a deselection of third gear and thereafter a selection of fourth gear take place as a result of the actuation of the shift clutches 48 and 60.

The further gear changes from fourth to fifth and from fifth to sixth gear take place correspondingly. In sixth gear (FIG. 7), the shift clutch 48 is shifted in such a way that the transmission input shaft 20 is connected directly to the hollow shaft 26 and, to that extent, the direct gear is selected.

A particular feature is the selection of seventh gear which is designed as a gear step with an overall transmission ratio lower than one (overdrive).

To change from sixth to seventh gear, first the multiple-disc clutch 16 is loaded until the shift clutch 48 can be deselected in a load-free manner. Subsequently, the multiple-disc clutch 16 is loaded further until the frictional connection is obtained. In this state, seventh gear is selected (FIG. 8) and the power flow is branched, but without a reactive-power flow, and runs to the planet carrier 34, on the one hand, via the input shaft 20 and, on the other hand, via the countershaft 22, wheel train 66, multiple-disc clutch 16 and ring wheel 38.

Consequently, the variable-speed transmission 10 can implement, overall, a high spread, along with a multiplicity of gears.

In seventh gear, the multiple-disc clutch 16 must be maintained in frictional connection. Consequently, power must be supplied either continuously or as required, in order to maintain the multiple-disc clutch 16 in frictional connection.

In one embodiment, a clutch is provided for bridging the inner and outer discs 70, 72. However, this would be comparatively complicated in structural terms. By contrast, "maintaining" the frictional connection reduces efficiency only slightly.

Overall, as compared with known centrally synchronized variable-speed transmissions, a marked reduction of the clutch torques in the higher gear changes is obtained. The transmission spread is increased by means of the overdrive, thus leading to a reduction in consumption.

As compared with a 7-gear transmission, in which the highest gear is designed as a direct gear and which otherwise corresponds in its basic set-up to the variable-speed transmission according to DE 197 41 440 A1, in this embodiment there is reduced extra outlay in structural terms. The number of dog clutches remains constant.

This is achieved essentially in that the inner disc of the multiple-disc clutch is connected to the loose wheel of the highest gear, specifically in the event of gear changes in which connection to the loose wheel of the lower gear is no longer possible (in this embodiment, from fourth gear onwards).

Since a connection to the output shaft is dispensed with, no additional clutch is necessary for connecting the inner disc to the loose wheel of the highest gear. Furthermore, by means of the present transmission concept, it is possible to design the multiple-disc clutch 16 for a torque which corresponds only to 1.5 times the drive torque. In other words, in the lower gear changes, a static clutch torque of 1.5 times the drive torque is required. In the event of higher gear changes, the clutch torque is reduced to 0.65 times the drive torque. By contrast, the static clutch torque required in the prior art in the event of the higher gear changes is 4.2 times as high as the drive torque.

Admittedly, the differential rotational speed in the multiple-disc clutch 16 is consequently increased in the higher gear changes. For the dimensioning of the components of the multiple-disc clutch, however, a reduction in the maximum torque level is of greater importance than a reduction in the differential rotational speed.

Although, for reasons of simple construction, the inner discs 70 can be connected to the loose wheel of the highest gear (here seventh gear), and not to the output shaft (here, hollow shaft 26), it is, of course, also possible selectively to allow connection to the output shaft (here, hollow shaft 26) in addition to the connection of the inner discs 70 to the loose wheel of the highest gear.

Even higher efficiency can be achieved, overall, in this embodiment.

Overall, by means of the variable-speed transmission according to the invention, a non-branched power flow is implemented in each case in the gear steps 1 to 6. In this power flow, the transmission input power flows, undivided, via the multi-step transmission (gears 2 to 6) or via the transmission input shaft (gear 1). The power is in this case not led via the multiple-disc clutch. Consequently, in these gear steps, positive force transmission is implemented in each case. The efficiency then corresponds approximately to that of a manual transmission in the countershaft form of construction.

On the other hand, in gear changes, a branched power flow occurs in each case. The transmission input power flows first via the drive shaft into the variable-speed transmission. The power is then divided at the branching wheel train. The two branches of the variable-speed transmission carry a power which in each case is lower than the drive power. Part of the power is in this case led via the friction clutch. The amount of power led via this branch is variable and is controlled via the actuation of the friction clutch. The other part of the drive power is conducted via a rigid branch, the kinematics of this branch being permanently defined. By contrast, the kinematics of this branch are defined indirectly by the variable branch in which the friction clutch is located. On the output side, the power is then summed again and supplied to the output shaft.

In the variable-speed transmission according to the invention, there is reduced branched power flow with reactive power. In the case of such a power flow, the engine power would be divided and then be combined again in the summing transmission. In this case, part of the power would be supplied, from this point, to the transmission output shaft. However, another part would be returned into the variable-speed transmission. This power part, designated as reactive power, would then be conducted via the friction clutch. In this case, too, the clutch would be active and would control the absolute quantity of reactive power. Standardized in terms of the drive power, the reactive-power fraction would be constant.

What is achieved by the measure whereby, in the second power command range, the inner disc is not connected to the output shaft, but, instead, to a further loose wheel, is that reduced branched power flow with reactive power occurs.

In so far as this loose wheel is stepped down in relation to the drive, the following further properties are obtained:

Overdrive in the highest (here, seventh) gear

Reduced clutch torques

Reduced shift times.

In general, the friction clutch is used during the shift operation. By the friction clutch being actuated, the engine rotational speed is reduced and the output rotational speed is increased. During the shift operation, rotational-speed synchronization is carried out by means of the friction clutch. For the second power command range, in which the inner disc is connected to the loose wheel of the highest gear, the invention allows a lower clutch torque, as compared with the prior art. Conversely, with the clutch torque being the same, the invention generates a higher moment of inertia at the input shaft. The engine can thereby be braked to the desired rotational speed more quickly.

Shift spontaneity can consequently be increased.

Figure 10:
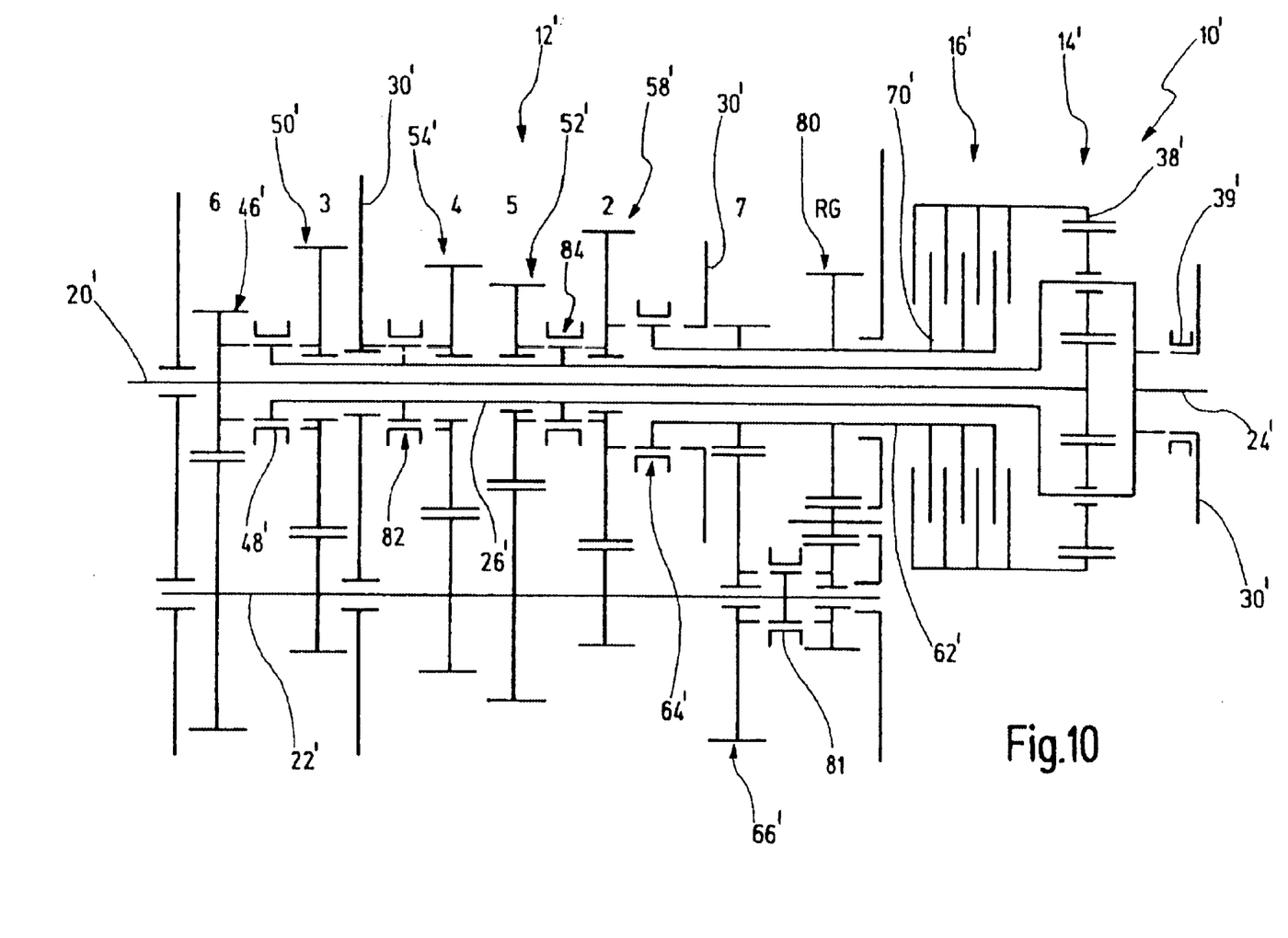
FIG. 10 shows a drawing of a transmission diagram of an alternative embodiment of the automatic variable-speed transmission.
Figure 11:
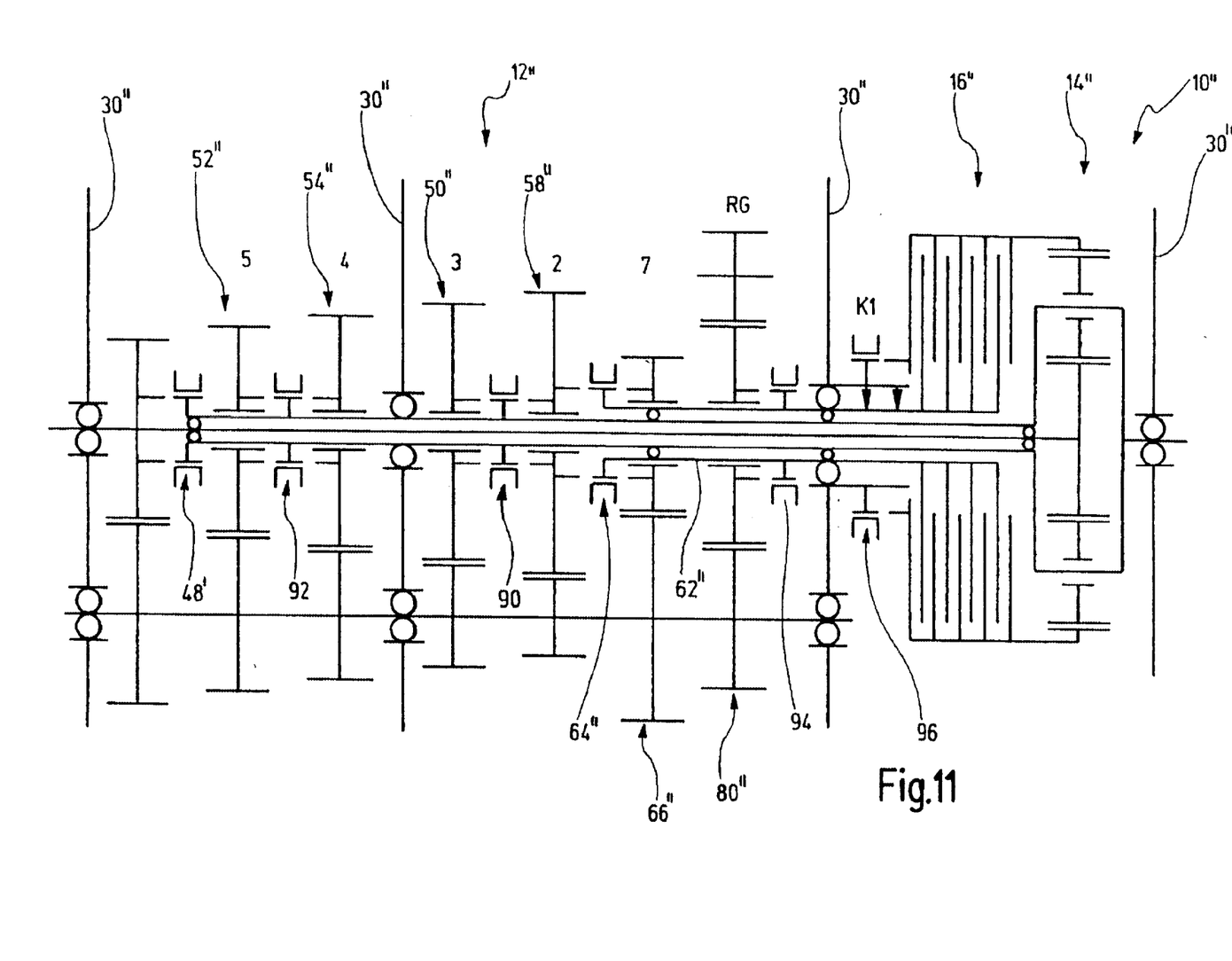
FIG. 11 shows a drawing of a transmission diagram of yet another alternative embodiment of the automatic variable-speed transmission according to the invention.

FIGS. 10 and 11 show alternative embodiments of an automatic variable-speed transmission, which, in these figures, is designated in general by 10' and 10" respectively.

The general functioning of the alternative variable-speed transmissions 10' and 10" corresponds to that of the variable-speed transmission of FIG. 1. In order to avoid repetitions, there is no need to describe once again the individual elements and their functioning. Only the respective differences in relation to the embodiment of FIG. 1 are dealt with below.

First, the two automatic variable-speed transmissions 10' and 10" have in common the fact that the respective multi-step transmission 12' and 12" has a separate wheel train 80 and 80" for reverse gear RG.

By a respective separate wheel train 80 and 80" being provided for reverse gear RG, the complexity of the automatic variable-speed transmission can be markedly reduced. In the embodiment of FIG. 1, to achieve a reversal of direction of rotation, the shift clutch 76 and the shift hub 42, which allow a reversal of direction of rotation in the planet-wheel train 14, are provided.

These shift clutches are not necessary in the embodiments of FIGS. 10 and 11.

Merely a further shift clutch for shifting the wheel train 80 and 80" is required. In the embodiment of FIG. 10, this shift clutch is integrated into a shift-clutch assembly, by means of which the wheel train 66' for seventh gear is also shifted.

Furthermore, in the automatic variable-speed transmission 10' of FIG. 10, the wheel-train arrangement is changed slightly, as compared with the variable-speed transmission of FIG. 1. Consequently, a shift clutch 82 for shifting the fourth gear and a shift clutch 84 for shifting the fifth and second gears are provided.

In the automatic variable-speed transmission 10" of FIG. 11, a further alternative wheel-train arrangement is provided. Consequently, a shift clutch 90 for shifting the second and third gears, a shift clutch 92 for shifting the fourth and fifth gears and a separate shift clutch 94 for shifting the reverse gear are provided.

Whilst, in the embodiment of FIG. 10, the shift clutch 81 is arranged on the countershaft 22', the separate shift clutch 94 is arranged on the outer hollow shaft 62".

The embodiment of the automatic variable-speed transmission 10' of FIG. 11 differs from the embodiment of FIG. 10 in that the friction clutch 16" is not connectable to the case 30' via the shift clutch 64', but via a separate shift clutch 96. As a result, a further separate supporting wall for connecting the friction clutch 16" to the case 30" may be dispensed with. The shift clutch 96 is in this case provided in direct assignment to the friction clutch 16".

Furthermore, in the two embodiments according to FIG. 10 and FIG. 11, a locking device 39' is provided, as in the first embodiment according to FIG. 1. This is illustrated in FIG. 10, but, for the sake of clarity, not in FIG. 11.

Figure 12:
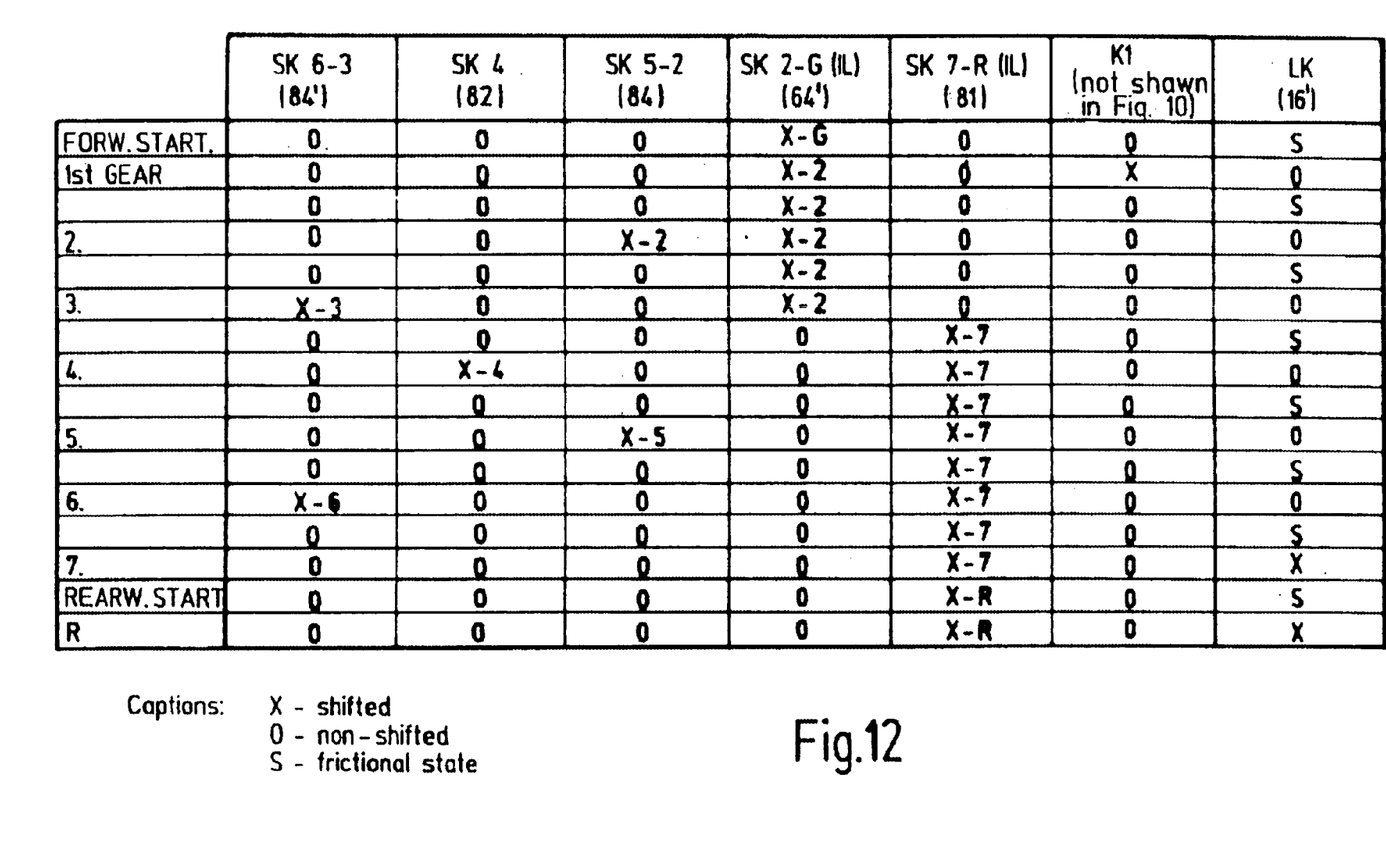
FIG. 12 shows a table of the shift states of shift clutches of the variable-speed transmission of FIG. 10 in different operating states.
Figure 13:
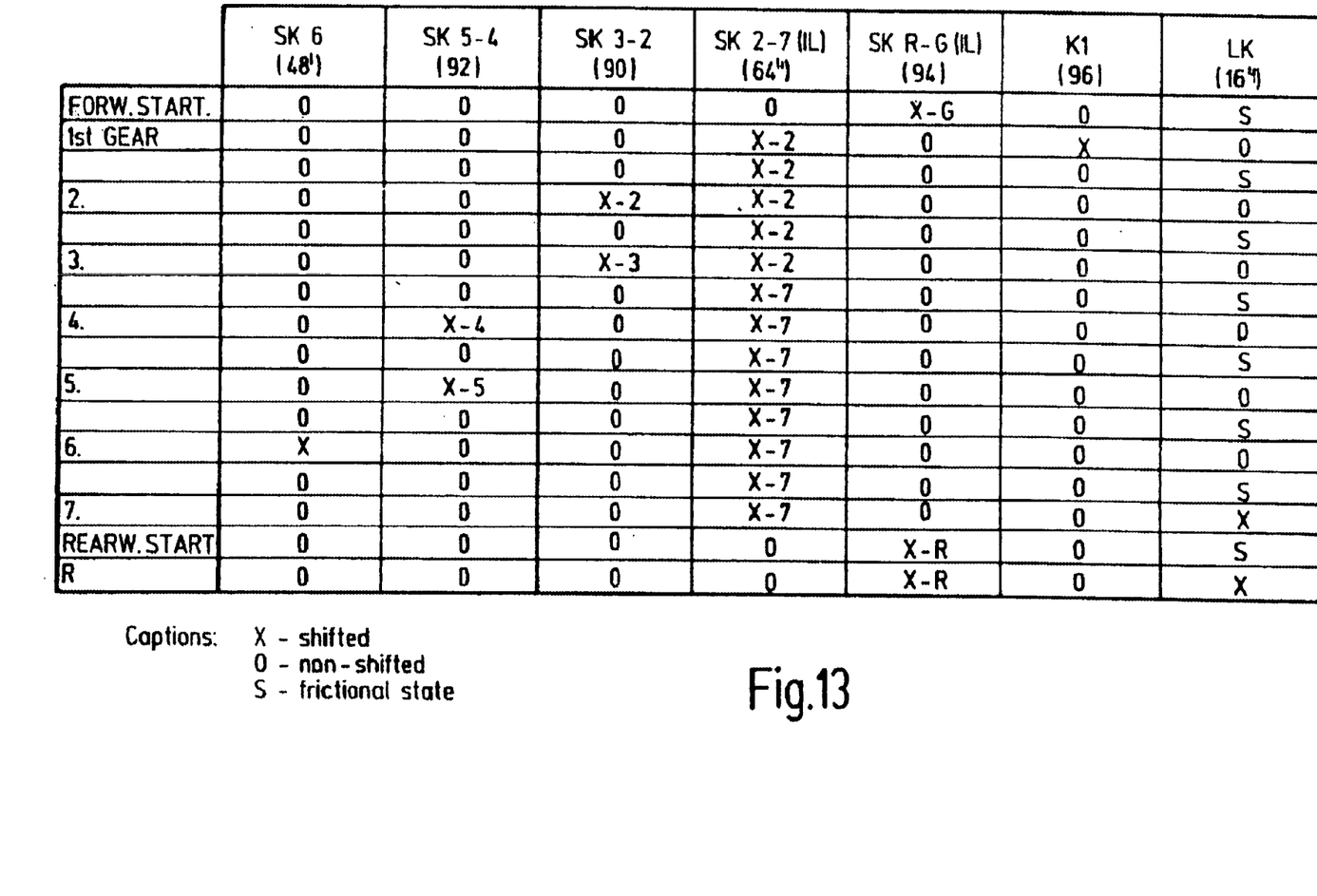
FIG. 13 shows a table of the shift states of shift clutches of the variable-speed transmission of FIG. 11 in different operating states.

FIGS. 12 and 13 depict, in a manner corresponding to FIG. 9, tables of the shift conditions of the shift clutches of the variable-speed transmissions 10' and 10", respectively, from which the operation of these transmissions can be derived in detail.

What is claimed is:

1. An automatic variable-speed transmission for setting up a plurality of gear steps comprising an input shaft, an output shaft and two transmission units which form two parallel branches, of which one branch has a multi-step transmission and the other a summing transmission with a friction clutch for starting and for central synchronization, the friction clutch having a first friction element and a second friction element, one of the friction elements being connectable to transmission elements by means of at least one shift element, with the result that at least one first power command range for gear-step changes between low gear steps and at least one second power command range for at least the gear change into the highest gear step and for the highest gear step are provided, the at least one shift element connecting the first friction element to transmission elements such that there is reduced reactive-power flow in any operating mode.

2. The automatic variable-speed transmission of claim 1, wherein the at least one shift element connects the first friction element in each case to a gearwheel of wheel trains of the multi-step transmission in both power command ranges.

3. The automatic variable-speed transmission of claim 1, wherein the multi-step transmission has an overdrive wheel train so as to provide an overall transmission ratio lower than 1 and wherein the at least one shift element connects the first friction element to a gearwheel of the overdrive wheel train in the second power command range.

4. The automatic variable-speed transmission of claim 1, wherein one of the gear steps is a direct gear step, and the direct gear step is a lower gear step than the highest gear step, so that the overall transmission ratio in the highest gear step is lower than 1.

5. The automatic variable-speed transmission of claim 1, wherein the input power in the highest gear step is branched to the two branches and the friction clutch is shifted into frictional connection.

6. The automatic variable-speed transmission of claim 5, wherein the input power in the other gear steps is directed as a non-branched power flow through the multi-step transmission.

7. The automatic variable-speed transmission of claim 1, wherein, by means of the at least one shift element, the first friction element of the friction clutch is selectively connectable to the case or to the wheel train for the highest gear step or to a wheel train for a further gear step.

8. The automatic variable-speed transmission of claim 7, wherein the further gear step comprises second gear.

9. The automatic variable-speed transmission of claim 7, wherein the further gear step comprises third gear.

10. The automatic variable-speed transmission of claim 1, wherein the friction clutch is arranged in an axial direction between the multi-step transmission and the summing transmission.

11. The automatic variable-speed transmission of claim 1, wherein the summing transmission comprises a planet-wheel train.

12. The automatic variable-speed transmission of claim 11, wherein the input shaft is connected to a sun wheel of the planet-wheel train.

13. The automatic variable-speed transmission of claim 11, wherein the second friction element of the friction clutch is connectable selectively to a ring wheel or a planet carrier of the planet-wheel train by means of a second shift element.

14. The automatic variable-speed transmission of claim 11, wherein the output shaft is connectable selectively to a ring wheel or a planet carrier of the planet-wheel train by means of a third shift element.

15. The automatic variable-speed transmission of claim 11, wherein the second friction element of the friction clutch is connected fixedly to a ring wheel of the planet-wheel train.

16. The automatic variable-speed transmission of claim 15, wherein the multi-step transmission further comprises a wheel train for reverse gear.

17. The automatic variable-speed transmission of claim 1, wherein the transmission input shaft is surrounded by a hollow shaft.

18. The automatic variable-speed transmission of claim 17, wherein the hollow shaft forms the output shaft of the multi-step transmission.

19. The automatic variable-speed transmission of claim 11, wherein the transmission input shaft is surrounded by a hollow shaft, the hollow shaft being connected to a planet carrier of the planet-wheel train.

20. The automatic variable-speed transmission of claim 17, wherein one wheel of a wheel train of the highest gear is mounted rotatably on the hollow shaft.

21. The automatic variable-speed transmission of claim 20, wherein that wheel of the wheel train of the highest gear step which is mounted rotatably on the hollow shaft is connected to the first friction element of the friction clutch.

22. The automatic variable-speed transmission of claim 16, wherein one wheel of the wheel train for reverse gear is mounted rotatably on the hollow shaft.

23. The automatic variable-speed transmission of claim 22, wherein that wheel of the wheel train for reverse gear which is mounted rotatably on the hollow shaft is connected to the first friction element of the friction clutch.

24. The automatic variable-speed transmission of claim 16, wherein a shift clutch is synchronized for the selection of reverse gear.

* * * * *